United States Patent [19]

Mendenhall et al.

[11] Patent Number: 5,812,760
[45] Date of Patent: Sep. 22, 1998

[54] PROGRAMMABLE BYTE WISE MPEG SYSTEMS LAYER PARSER

[75] Inventors: Todd Mendenhall; Darren Neuman; Manabu Gozu, all of San Jose, Calif.

[73] Assignee: LSI Logic Corporation, Milpitas, Calif.

[21] Appl. No.: 670,090

[22] Filed: Jun. 25, 1996

[51] Int. Cl.[6] .............................. G06F 13/00; H04N 7/00
[52] U.S. Cl. ...................................... 395/185.02; 348/467
[58] Field of Search ........................ 395/185.02, 185.01, 395/185.07, 185.1, 183.13, 185.06, 185.03; 348/467

[56] References Cited

U.S. PATENT DOCUMENTS

| | | | |
|---|---|---|---|
| 5,526,054 | 6/1996 | Greenfield et al. ...................... | 348/467 |
| 5,533,021 | 7/1996 | Brandstad et al. ...................... | 370/60.1 |
| 5,561,670 | 10/1996 | Hoffert et al. ........................... | 370/94.1 |
| 5,652,749 | 7/1997 | Davenport et al. ...................... | 370/466 |
| 5,675,829 | 10/1997 | Okkouy et al. .......................... | 395/826 |
| 5,689,509 | 11/1997 | Gayton et al. ........................... | 370/396 |

OTHER PUBLICATIONS

Thomas La Porta, et. al., The Multistream Protocol: A Highly Flexible High Speed Transport Protocol, Journal on Selected Areas in Communication, vol. 11, No. 4, IEEE, 4 May 1993.
T.H. Doi et al., A PC–Based MPEG Compressed Data Decoder, Nanyang University, Singapore, IEEE Transaction on Consumer Electronics, vol. 41, Issue No. 4, 22 Aug. 1995.
Beriont, W., The Broadband Network Interface for Television, GTE Labs, Mass., IEEE Transaction on Consumer Electronics, vol. 38, No. 4, pp. 906–909, 4 Nov. 1992.
V. Bhaskaran, Media Processing in the Compressed Domain, H P Labs, Palo Alto, CA., Compcon 96 IEEE Computer Society Int'l pp. 204–209, 1996.
Galbi, A. et al., An MPEG–1 Audio/Video Decoder w/ Run–Length Compressed Antialiased Video Overlays, IEEE Solid State Circuit Conference, 1995, pp. 286–287, 1995.
Keck, Wolfram, A Method for Robust Decoding of Erroreous MPEG–2 Bitstreams, University of Stuttgart, Germany, IEEE vol. 42, No. 3 Transaction on Consumer Electronics, pp. 411–421, 10 Jun. 1996.
La Porta, T. et al., Performance Analysis of MSP:Feature–Rich High Speed Transport Protocol, IEEE Transaction on Networking. vol. 1, No. 6, pp. 740–753, 6 Dec. 1993.
Pasquale, Joseph et al., Real–time dissemination of Continuous Media in Packet–Switched Networks, Compcon Sir 93, IEEE Computer Society Int'l Conference, pp. 47–48, 1993.

*Primary Examiner*—Robert W. Beausoliel, Jr.
*Assistant Examiner*—Norman M. Wright
*Attorney, Agent, or Firm*—Fenwick & West LLP

[57] ABSTRACT

A programmable, byte wise, multimedia bitstream parser comprises an input data organizer, a data management buffer, a register file, a logical unit and a microprogram controller. A data source alternatively provides a bitstream to a parallel or serial port and the input data organizer, which includes a serial to parallel converter and a multiplexer, arranges the incoming data into a parallel stream of bytes for passage to the data management buffer. Status flags are associated with each byte passing through the management buffer to facilitate data processing, including start code and context identification and error handling. The register file includes counters and intermediate data buffers for processing a plurality of layers with data quantities which are not predetermined by syntax. Additionally, the register file is provided in tandem for dual context processing. The microprogram controller is arranged to communicate with the input data organizer, the data management buffer and the register file for the processing of byte wise data. The microprogram controller includes a program on microcode ROM for increased efficiency, accommodation of modifications and debugging, and decreased cost.

13 Claims, 6 Drawing Sheets

PROGRAMMABLE BYTE WISE MPEG SYSTEMS LAYER PARSER

FIELD OF THE INVENTION

This invention relates generally to the processing of multimedia bitstreams and more particularly to a system for parsing MPEG Systems Layer bitstreams in programmable, byte-wise fashion.

BACKGROUND OF THE INVENTION

Several industry standards have been provided for the exchange of digital information such as those established by the Moving Pictures Experts Group (MPEG) for full motion compression on digital storage media. The MPEG standards organize data into various fields known as layers. Some layers include raw, or elementary data, such as the blocks, slices, pictures and groups of pictures which form a moving video image. Other layers, referred to as systems layers, include data processing information such as that for decoding and synchronizing the compressed elementary data.

Typically, a bitstream of compressed data is transmitted to decoders which convert, or decompress the data for processing. Sometimes, the bitstreams merely comprise raw data which may be passed directly to the decoder. If the data comprises separate types such as raw audio and raw video data, such types must be segregated, or parsed, into separate buffer. Often, however, the streams include other information, such as the systems layer, which must be parsed, from the raw data prior to decoding. Additionally, the systems layer typically includes various sublayers which may require parsing into separate buffers.

One problem presented in the design of bitstream parsers is the ever increasing bandwidth demands of fast, high resolution multimedia applications. As the efficiency of bitstream decoders increases to service data to meet these demands, so must that of the parsers which provide their data.

Another problem is the variety of contexts and operational modes by which multimedia data may be exchanged. For example, the MPEG bitstreams may be presented to a parser in serial or parallel fashion, over audio and video ports, and via elementary, systems/program and packetized elementary stream (PES) data transfer modes with various layer components and syntactical relationships.

Conventional MPEG bitstream parsers operate serially, are application specific hardwired devices, include very large state machines which are extremely difficult to maintain and nearly impossible to modify, and require large, inefficient shift registers to serialize incoming parallel bitstreams. Software models, which merely emulate the hardwired devices, fail to remedy the problems of application specificity, ease of modification and debugging, and encounter other bottlenecks. Thus, there is a need for a multimedia parser which overcomes the problems of conventional parsers.

SUMMARY OF THE INVENTION

In accordance with the present invention, a byte-wise programmable multimedia bitstream parser is provided to facilitate increased efficiency, easier identification and treatment of problems, and operation on various data contexts transfer modes.

The parser includes an input data organizer, a data management buffer, a register file, a logical unit, and a microprogram controller. Data is input through audio and video ports to the parser in parallel bytes, or, alternatively, serially, wherein the parser converts the serial data to data bytes which are passed to the data management buffer, which maintains the data and associates status flags with each byte to facilitate its processing. The register file includes dual register sets to handle context switching between data from the various ports. The logical unit includes inputs for data comparison, and the microprogram controller, preferably at the direction of a custom instruction set, controls data parsing by coordinating the operations of the input data organizer, the data management buffer, the register file and the logical unit.

The status flags associated with each byte in the data management buffer provide processing information to the controller. An Audio/Video ("AV") flag, in conjunction with the dual register sets, facilitates processing in dual contexts by maintaining an audio or a video context for each byte passing through the data management buffer. A Synchronization ("Sync") flag may be used in two ways. First, it may be used to indicate that the input data organizer detected a start code associated with the current byte. A detected start code may be compared to predetermined data for identification and parsing of the data bytes following the start code. Alternatively, the Sync flag may be used to indicate that data remains synchronized while it is being loaded from the data management buffer. Finally, an error flag may be set where the data source issues an error associated with a processed byte or, alternatively, may be set where the controller detects an error with the processing of data. In either case, the controller may implement programmable error handling routines.

The register sets are arranged in pairs to handle context switching between data received from the audio, or alternatively, the video port. Additionally, the sets include counter and data buffer registers to accommodate temporary storage of data and the processing of bitstream layers which do not have a predetermined length.

The status flags and dual register sets facilitate a byte-wise flow of data which may be more efficiently processed than a serial stream. Additionally, because the parser processes data in bytes, it may be easily programmed and, likewise, modified to handle a variety of incoming bitstreams. Parser efficiency and ease of modification is enhanced by provision of a microprogram controller which may be programmed using instructions which are customized to an application or related groups of applications.

DETAILED DESCRIPTION OF THE INVENTION

Figure 1A:
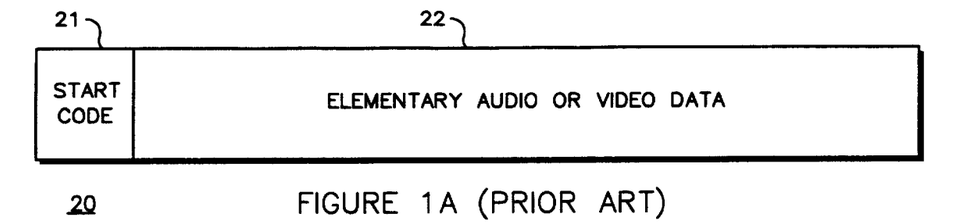
FIGS. 1a–1c are block diagrams illustrating conventional elementary, systems and program bitstream profiles.

Referring to the block diagram of FIG. 1a, an elementary MPEG stream profile is shown to include start code 21 and data 22 portions. The start code 21 is typically 32 total bits and includes a twenty four 24 bit start code prefix (usually 23 zeroes followed by a 1) followed by an 8 bit stream identifier (in hexadecimal, 0000 01xx, where xx is the identifier).

Elementary mode bitstreams typically include raw audio or video data which may be directly provided to a decoder or intermediately stored in a buffer and, thus, do not require systems layer parsing. Preferably, though, audio and video data are parsed into separate buffers for decoding.

Figure 1B:
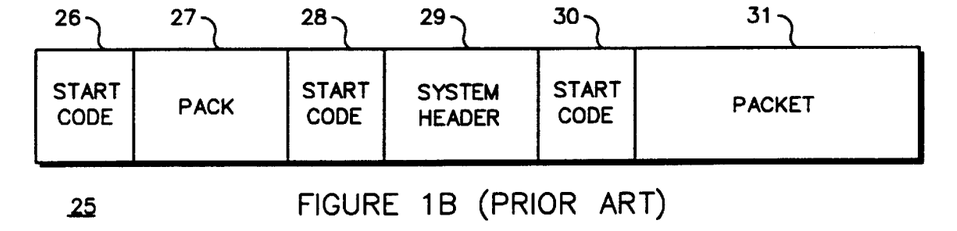

Referring now to the block diagram of FIG. 1b, a simplified MPEG-1 systems stream profile 25 is shown to include a pack layer 27, system header layer 29, packet layer 31 and corresponding start code portions 26, 28, 30. The pack layer 27 and system header layer 29 have a length which is predetermined by MPEG syntax. These layers 27, 29 are identified by start codes 26, 28, and provide, for example, bitstream decoding and synchronization information. The data in the packet layer 31 may be elementary audio or video, private MPEG data, or stuffing (garbage data) as defined by the start code stream identifier. In contrast to the pack layer 27 and system header layer 29, the length of the packet layer 31 is not predetermined by syntax standards. Rather, the packet layer length, and other information, is provided within the bitstream in a predetermined location (usually immediately following the start code). Parsing is more complicated than in the elementary mode since the various layers, such as the system header and the packet, may each be parsed into separate buffers and, moreover, since the length of the packet layer 31 may not be predetermined.

Figure 1C:
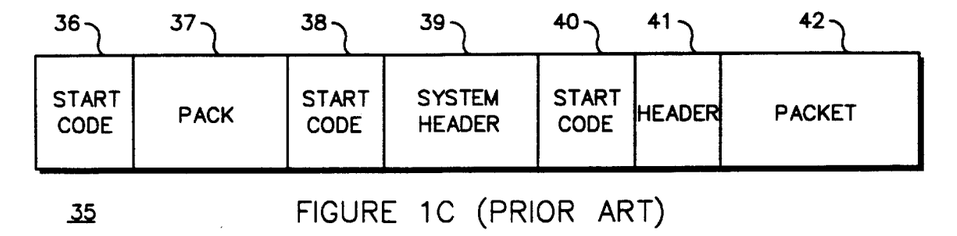

Referring now to the block diagram of FIG. 1c, an MPEG-2 Program bitstream 35 is shown to include a pack layer 37, system header layer 39, packet layer 42 and corresponding start code 36, 38, 40 portions. This stream profile is similar to the systems stream profile 25 except for its provision of a separate header 41. The bitstream 25 includes information such as the length of the header 41 and the packet layer 42. Neither the length of the header 41 or the packet layer 42 are predetermined by MPEG syntax, further complicating parsing.

In a PES transport stream, 188 byte portions of data are provided to a transport decoder which typically outputs PES packets one byte at a time. The PES packets, which may comprise audio and video data without a predetermined order, may be input to the parser. Referring now to the block diagram of Figure 1d, in the PES operational mode 50 the bitstream is divided into portions 51, 52, 53 with non-predetermined lengths. Specifically, audio 51, 53 and video 52 packet portions of one or more bytes are multiplexed for PES transmission to the parser by the transport decoder.

Figure 2:
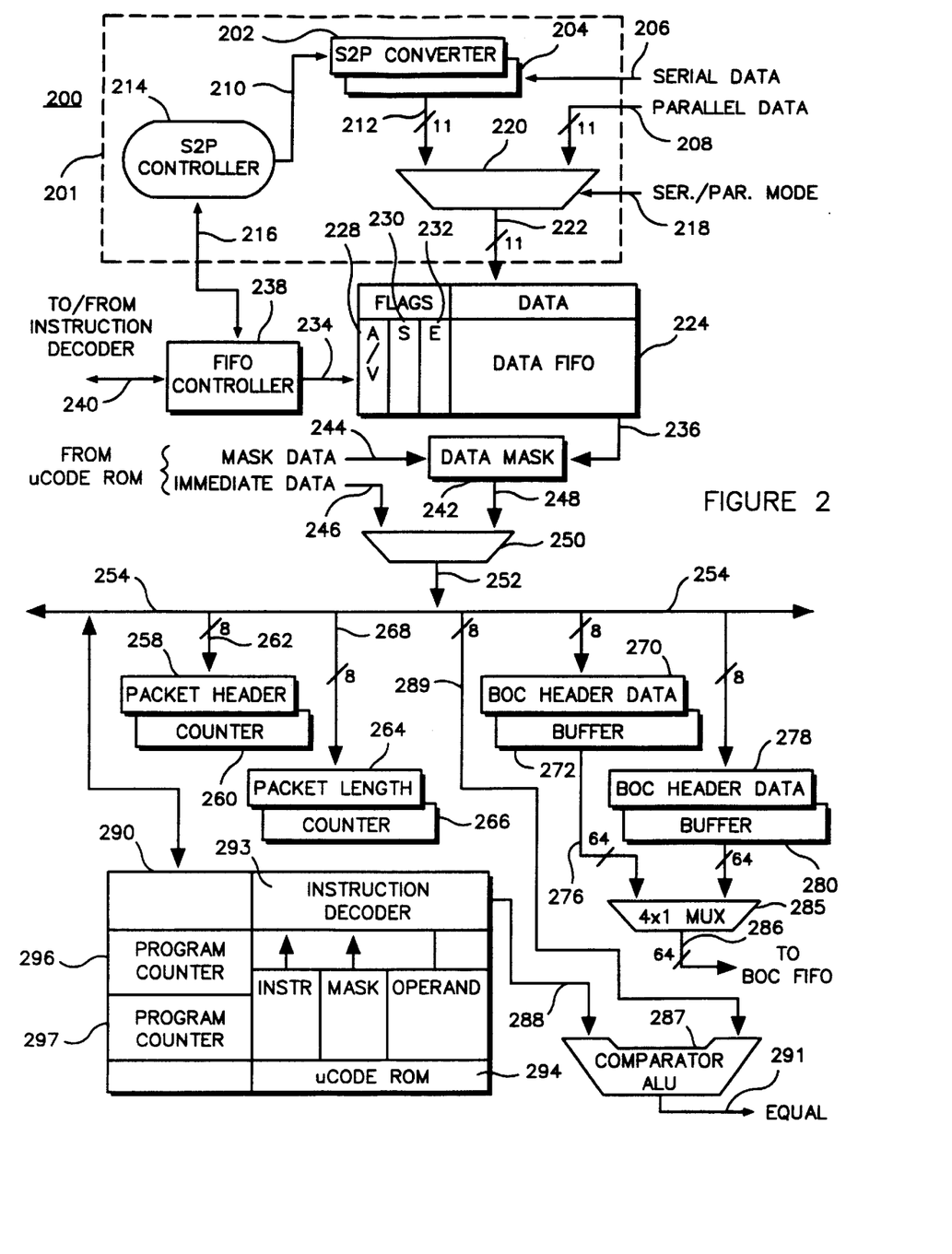
FIG. 2 is a schematic diagram illustrating a preferred embodiment of the programmable systems layer parser in accordance with the present invention.

Referring now to the schematic diagram in FIG. 2, a preferred embodiment of the programmable byte-wise data parser 200 of the present invention is shown. The input data organizer 201 preferably includes two serial to parallel converters 202, 204, a serial to parallel converter controller 214 and a multiplexer 220. The two serial to parallel converters 202, 204 for audio 204 and video 202 contexts each include a serial data input 206 (shown as a single, shared input port which accommodates multiple contexts), a control input 210 and a data byte output 212. The serial to parallel controller 214 is coupled 210 to send and receive control signals to and from the converters 202, 204 and the outputs 212 of the converters 202, 204 are input 212 to a multiplexer 220 which also includes a parallel port input 208 (also shown as a single, shared input), a serial/parallel mode control input 218 and a data output 222 which serves as the input data organizer 201 output.

Preferably, the data management buffer is a first-in-first-out buffer or register ("data FIFO") 224 which receives data bytes from the multiplexer output 222 and includes a control input 234 and a data output 236. The signals for the control input 234 are supplied by a data FIFO controller 238 which is coupled to the serial to parallel converter controller 214 and the microprogram controller 290. Each word in the data FIFO 224 includes a preselected number of data bits, preferably 8, and three status flags-AV 228, Sync 230 and Error 232. The data FIFO 224 output 236 and mask data 244 are input to a data mask 242 which provides data 248 to a multiplexer 250 along with immediate data 246 from microcode ROM 294 to provide a data output 252 to the system bus 254. Mask and immediate data as well as control signals for controlling the data mask 242 and multiplexer 250 are provided by the microprogram controller 290.

The register file includes dual register sets to handle instantaneous context switching between the audio and video ports. Each register set is coupled to the bus 254 and comprises interrupt vector registers (not shown), counters 258, 260, 264, 266 and intermediate data buffers 270, 272, 278, 280. The register file includes corresponding audio and video context packet header counters 260, 258, packet length counters 266, 264, bottom of channel ("BOC") header data buffers 272, 270 and BOC packet data buffers 280, 278. Each of the register sets is coupled 262, 268, 274, 282 to the data bus. Additionally, the BOC header data buffers 278, 280 and the BOC packet data buffers 270, 272 output 284, 276 to a 4×1 multiplexer 285 which selects data 286 for a BOC FIFO (not shown).

The logical unit is conventional and includes a comparator 287 with inputs 288, 289 connected to the bus 254 and the microprogram controller 290 with an equal output 291 which provides signals to the controller 290.

The microprogram controller 290 preferably includes an instruction decoder 293 which includes logic to decode and execute instructions; a read only memory (ROM) 294 for storing microcode instructions, masking data and other information; and a plurality of program counters 296, 297 for processing data in dual contexts. The microprogram controller 290 is in communication with various elements including the serial to parallel converters 202, 204, the data FIFO 224, the register file and the logical unit 287 through a system bus 254. The controller 290 processes data in byte wise fashion at the direction of programmable instructions stored in the microcode portion of ROM 294.

In the operation of the parser 200, serial/parallel mode bit 218 is set to control the multiplexer 220 to provide data bytes to the data FIFO 224 from either the serial to parallel converters 202, 204 or a parallel port connected to the parallel input 208.

Data may be provided to the parser 200 through audio and video ports. Preferably, the data is supplied through a shared port with two valid (audio and video) and two request signals, although a variety of arrangements, including two separate ports, may be implemented. The AV bit 228 is set dependent upon the data input port. For example, if the audio valid signal is set for incoming data, then the AV bit in the data FIFO 224 is set as audio (0 or 1, as selected). Likewise, if subsequent data is transferred on video valid, then the AV bit 228 associated with such bytes is set as video. It is recognized that in certain data transfer modes, audio, video and other data may all be provided over a selected port, and that, in such instances, the AV bit 228 merely identifies the port through which the data is provided, rather than the type of data provided. Association of the AV bit 228 to the data bytes in the data FIFO 224 provides an ongoing data context record which may be used by the controller 290 to segregate and separately process such data.

Serial input data 206 is provided to the serial to parallel converters 202, 204 which convert the serial bitstream into parallel bytes of data and supply data bytes for each context to the multiplexer 220 for selective input to the data FIFO 224.

The converters 202, 204 may be prompted by the controller 290 to seek start codes in the incoming bitstream. Each serial to parallel converter 202, 204 is arranged to detect an MPEG start code comprising twenty three zeroes followed by a one and a start code identifier. Preferably, a state machine is used which detects start code prefixes by finding twenty three consecutive zeroes followed by a one. As logical zeroes are detected in the bitstream, the state machine progresses from an initial, or first state through a twenty third state. If a logical one is detected prior to the detection of twenty three consecutive zeroes, the state machine reverts back to the initial state to seek another string of zeroes. Otherwise, after reaching the twenty third state the state machine remains in the twenty third state while zeroes continue to be detected in the bitstream and, upon the detection of a one in the bitstream, a start code is detected. When a start code is detected, the start code identifier byte which typically follows the string of 23 zeroes and a one is passed to the data FIFO 224. The sync flag 230 is set (e.g. to logical one) in association with the identifier byte so that the parser 200 can process the byte as an identifier byte and, similarly, identify the data which follows it.

After the detection of a start code, the serial to parallel converters 202, 204 continue to convert the serial bitstream (for each context) into parallel bytes for processing. The sync flag 230 remains or is set to zero in association with such bytes. Since the sync flag 230 may be monitored for each processed byte, the parser 200 may be arranged to continuously process the byte aligned data while the sync flag remains at a given state (such as at zero for byte aligned data following a detected start code).

The converters 202, 204 may also be prompted to seek unexpected start codes in the bitstream. An unexpected start code is detected by the state machine in the same fashion that a sought start code is detected as explained above and, similarly, the sync flag 230 may be set upon the detection of a start code. An unexpected start code could indicate a synchronization error. Thus, while the controller 290 is in the process of parsing byte aligned data, it may prompt the serial to parallel converters 202, 204 to provide notification of an unexpected, non-byte aligned start code, or, in other words, a sync error, so that the controller 290 may interrupt processing of the synchronized byte aligned data. Specifically, the controller 290 is arranged to continuously process byte aligned data while the sync flag 230 is at logical zero and branch to a synchronization error handling routine if an unexpected start code is indicated by the sync flag 230 at logical one. Those skilled in the art will recognize other synchronization errors, such as controller detected sync errors, which may be monitored using the sync flag 230.

In the parallel mode, it is assumed that the data presented to the parser 200 has been byte aligned. Therefore, the sync flag 230 may be ignored by the controller 290 for the purposes of start code detection while the parser 200 is operating in the parallel mode or the sync flag 230 may be tied to ground. In the parallel mode, start codes in the byte aligned data may be sought and detected by the controller 290 by using programmed code which facilitates the comparison of data bytes to predetermined data (e.g. to detect twenty three zeroes followed by a one and a start code identifier, a string of bytes such as 00, 00, 01, xx could be detected).

In addition to AV 228 and Sync 230 flags, an Error flag 232 may be associated with bytes in the data FIFO 224 to indicate an error. The error flag may be set by the source of data through an external error pin (not shown) where the data source detected and issued an error signal associated to the transmitted data. Additionally, the microprogram controller 290 may detect a syntax error in the bitstream and set the error flag, 232 through the FIFO controller 238. For example, if a packet layer is being parsed and the number of bytes which are input to the parser 200 differ from an expected quantity (as predetermined by syntax or as determined from within the bitstream), then the controller 290 may detect such a syntax error and, accordingly, set the error flag 232 in association with the defective byte or bytes. When the error flag 232 is set for a processed byte, the affected program counter 296, 297 will be forced to the interrupt vector provided that the interrupt is not masked. Interrupt handling is preferably provided by the dual interrupt vector registers (not shown). The interrupt is maskable with a mask bit that is set by the microprogram controller 290 and is programmable to handle multiple interrupt routines.

The data is sequentially loaded in bytes from the multiplexer 220 to the data FIFO 224 and, since each data word preferably includes eight bits of data and three status bits, the three flags 228, 230, 232 remain associated with the data bytes to facilitate processing by the microprogram controller 290. The data FIFO 224 sequentially provides data bytes for parsing to the system bus 254 at the direction of the controller 290.

The register file is connected to the system bus 254 to receive bytes which pass through the data FIFO 224 or, alternatively, data for processing such bytes. The packet header counters 258, 260 maintain the number of data bytes contained in a processed packet header and work with the BOC header data buffers 270, 272 to parse packet header data. Similarly, the packet length counters 264, 266 maintain the amount of packet data to be segregated into the BOC packet data buffers 278, 280. For example, the packet length may be indicated as 64 Kbytes, and that value may be loaded into the appropriate packet length counter 264, 266. Subsequent packet data bytes would be sequentially loaded into the appropriate packet data buffer 278, 280, and, as such bytes are loaded, the packet length counter 264, 266 may be decremented to monitor the amount of remaining bytes to be loaded. The data temporarily stored in the data buffers 270, 272, 278, 280 is provided to multiplexer 285 which directs it to another buffer, preferably a bottom of channel (BOC) FIFO (not shown) which, in turn, provides the data to a destination buffer such as a DRAM channel (not shown) arranged per MPEG standards. The various buffers facilitate a steady flow of data to the DRAM channel to prevent it from emptying (and causing a gap in decoding) This architecture, in conjunction with the custom parsing instruction set and with an appropriately size and service rate for the BOC, provides a minimum data transfer rate of approximately 40 megabits per second.

The register file also includes dual sets which, in conjunction with the dual program counters 296, 297, facilitate instantaneous context switching between data transferred through the audio and video ports. Specifically, where the bytes of data are identified as video by the AV flag 228 in the data FIFO 224, they are processed using the video program counter 296 and video register set 258, 264, 270, 278. The information for a first context may be retained in these registers while another context, or an interrupt handling routine, is processed.

The logical unit 287 is arranged to compare data and, on a positive comparison, output an equal flag 291 which feeds back to the microprogram controller 290. The equal output may be used to identify bytes from the data FIFO 224 or other data. For example, if a data byte is recognized as a start code, the controller 290 may pass the start code identifier byte to the logical unit 287 to compare it to immediate data 246 from the microcode ROM 294 for identification.

The microprogram controller 290 manages comparison, flow and storage of data bytes from the data FIFO 224 by issuing control signals to and receiving signals from the logical unit 287, the register file, the serial to parallel converters 202, 204 and the Data FIFO 224.

The controller 290 incorporates various operations to manage the flow of byte aligned data through the data FIFO 224. Specifically, the controller 290 may mask the present byte by supplying data and appropriate controls to the data mask 242, pass the byte to the logical unit 287 for identification or comparison to other data, load the byte into a buffer for that type of data, or load the byte into an appropriate register in the register file. For example, elementary video data may be transferred into a video data buffer such as a DRAM channel, or, where an MPEG program bitstream is processed, bytes of packet 31, 42 data may be loaded into a BOC packet data buffer.

The controller 290, in conjunction with the register file, is arranged to process layers of data with various predetermined and non-predetermined lengths. If the identified bitstream has a fixed, predetermined length (e.g. as defined by syntax), then the number of bytes which must be sent to the appropriate buffer may be provided in the program code in microcode ROM 294. However, if the bitstream length is not predetermined, then the number of bytes which must be sent to a buffer is preferably determined from information in the bitstream and loaded into a counter whereby the extent of data loading into an intermediate buffer can be tracked. For example, if a bitstream start code is recognized as an MPEG-1 systems stream packet layer 31, then the length of the bitstream is found, according to syntax, in the packet layer header. The length can be converted into the number of bytes which must be loaded from the data FIFO 224 for parsing into the packet layer buffer and this number is loaded into a packet length counter 264, 266 for tracking. If packet layer parsing is ongoing and the present context is interrupted, for example, by byte aligned data from the other context or an interrupt, then the counter will maintain the number of bytes which must still be parsed.

Since a microprogram controller 290 is used for parsing, a custom instruction set may be designed for each application using microprogramming techniques. An instruction set and corresponding microprogram for a common application may be designed and provided in microcode ROM 294. This allows for flexible parser design and easy debugging and variation from application to application. Additionally, since only necessary instructions are implemented, the parser is extremely efficient. Finally, a parser for a common application may be designed and provided very inexpensively.

Preferably, the instruction set facilitates comparison of data for identification and other purposes, storage of data and branching to predetermined routines under defined conditions and control of the flow of data. These basic operations allow the parser to be programmed to operate as specified above and, more specifically, to process MPEG data as set forth below. For example, instructions may be provided which facilitate comparison of start codes to known data to identify bitstreams, storing data in locations appropriate to the identified data type, branching to routines including error handling routines, and continuously storing data while it is synchronized and no error has occurred.

Figure 3A:
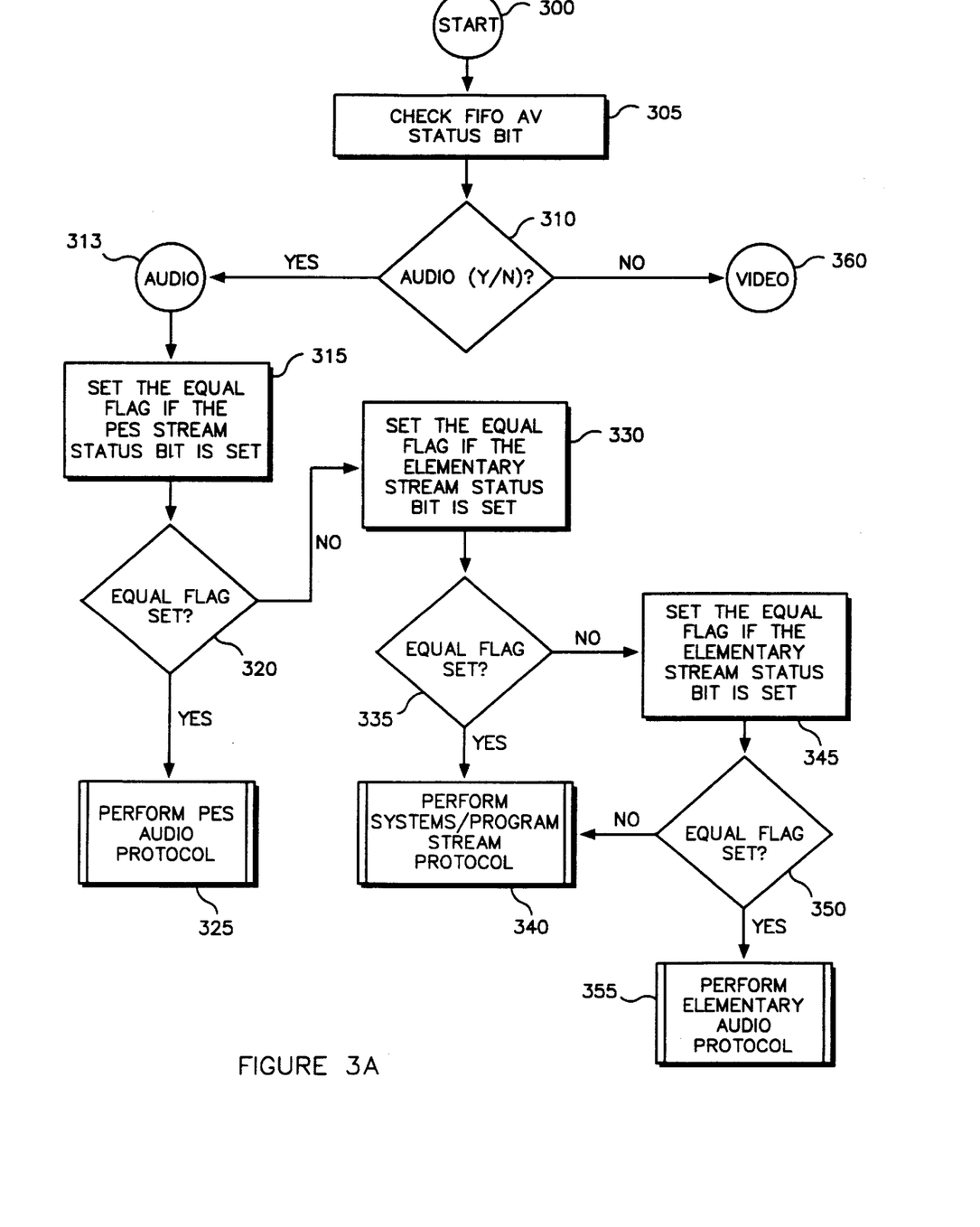
FIGS. 3a–b are flow charts illustrating parser mode determination in accordance with the present invention.

Now referring to the flow chart in FIG. 3a, shown is operation of the parser 200 in transfer mode and data type recognition. The controller 290 initially checks 305 the AV status bit 228 to determine the present context. This is preferably done by masking the data byte and comparing the masked data to predetermined (immediate) data using the logical unit 287 sets the equal output 291 upon a positive identification. Where the audio context is indicated, the controller 290 branches 310 to an audio mode determination routine 313 wherein it prompts the logical unit 287 to set the equal output 291 if the PES Stream mode bit (not shown) is set 315 and branches 320 on equal to the PES Audio Data operational mode 325. If the equal flag is not set in the PES stream status bit comparison step 320, the Systems/Program Stream Status bit is checked 330 to determine whether to branch to that operational mode 340. Similarly, the controller determines whether the Elementary Stream Status bit is set 345 to branch 350 to that mode 355 or, by default, to the Systems/Program Stream protocol 340.

Figure 3B:
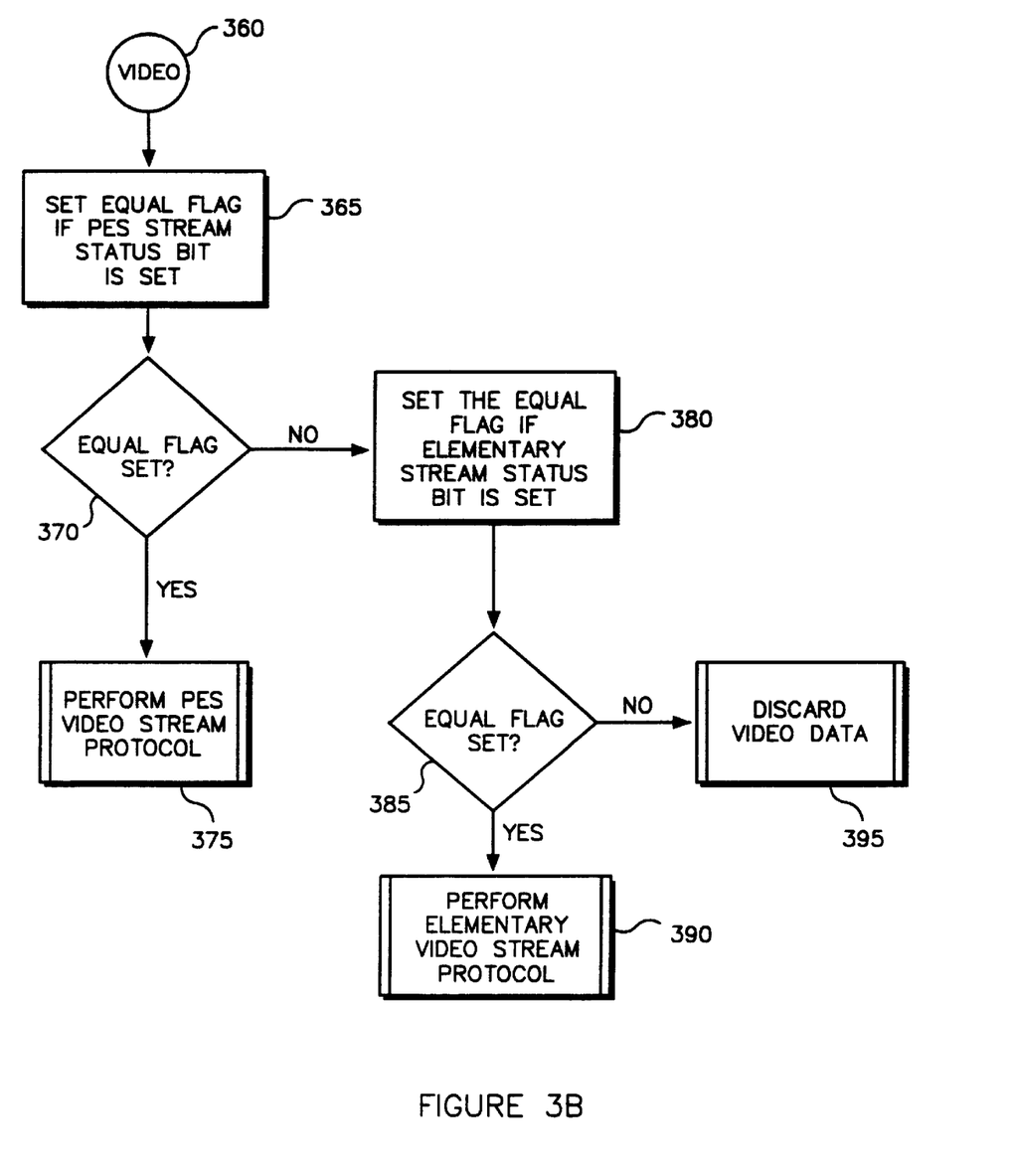

Now referring to the flow chart in FIG. 3b, parser 200 operation for mode determination 360 where the AV status bit 228 indicates the video context is shown. The controller 290 initially determines whether the PES Stream mode bit is set 365, branches 370 on equal to the PES Video Stream protocol 375 and otherwise determines whether the Elementary Stream mode bit is set 380 to branch 385 to that protocol 390 or, alternatively, to the discard video data protocol 395.

In the elementary mode, raw MPEG audio and video data are expected by the parser. Systems layer parsing is not necessary in this mode, because the data is merely compressed audio and video data which are presumed to have been strobed into their respective audio and video ports and are processed accordingly.

Figure 4:
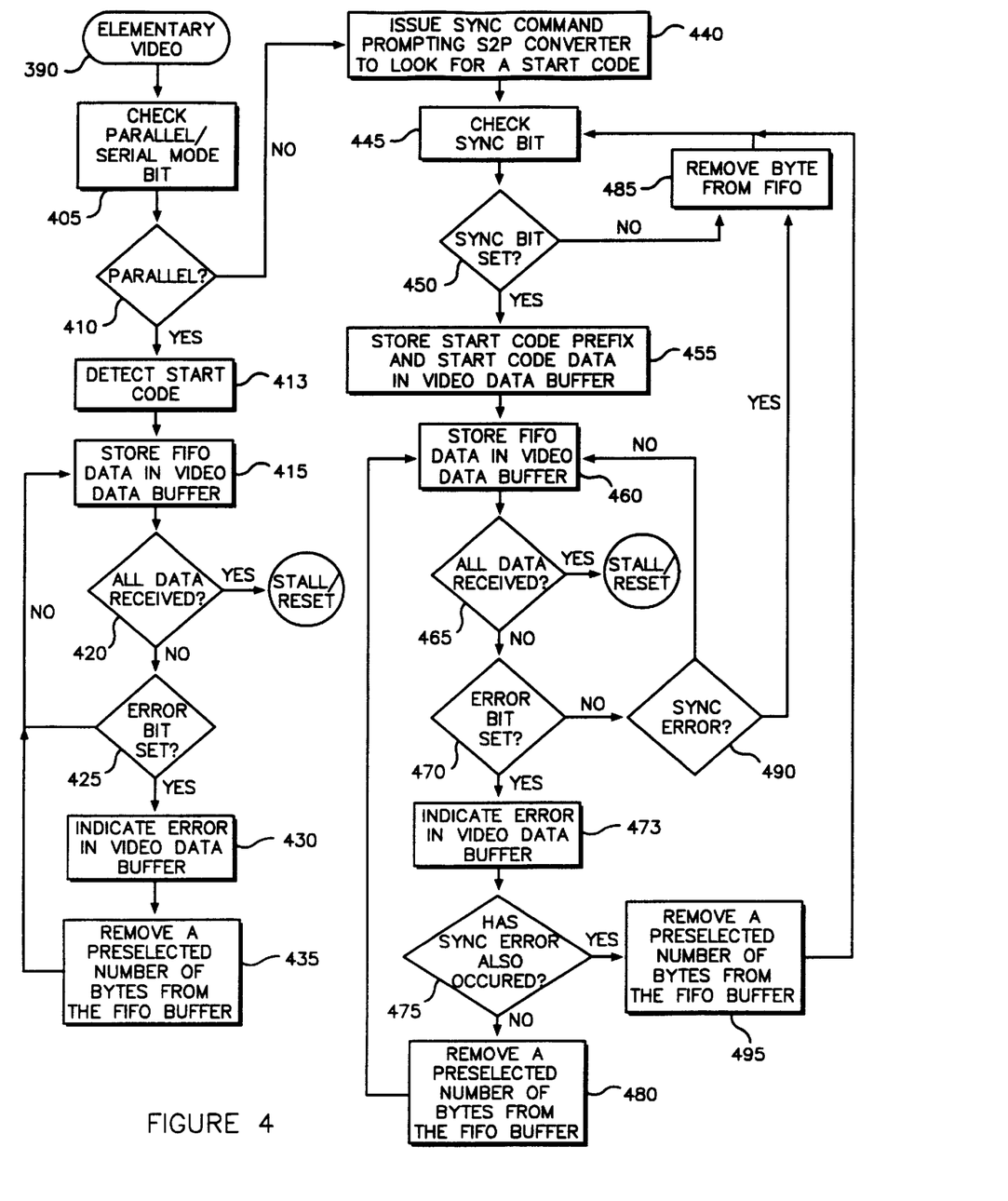
FIG. 4 is a flow chart illustrating parser operation in the elementary video mode in accordance with the present invention.

Referring now to the flow chart in FIG. 4, parser 200 operation in the elementary video 390 operational mode is shown. The controller 290 initially determines whether parallel or serial data are incoming by checking that mode bit 405 and branches 410 to the appropriate data input mode. For parallel data, a start code may be detected 413 by using the logical unit 287 in a series of comparisons to detect twenty three zeroes followed by a one (the bytes are assumed to be aligned in the parallel mode) as described above. After detection 413 of a start code, bytes are continuously loaded 415 from the data FIFO 224 to a destination buffer such as a video data buffer (not shown) while they remain synchronized and no data error 425 has been issued by the source of data. A set error bit 425 may initiate any desired error handling routines, such as one which indicates 430 the error in the video data buffer, removes 435 a preselected number of bytes from the data FIFO 224 and returns to data loading 415. When the supply of data is exhausted such that all of the data has been received 420, the controller enters a stall mode, or, where the controller is reset, seeks a new start code.

For serial data, the controller 290 issues 440 a synchronization command prompting the serial to parallel converters 202, 204 to seek start codes in the incoming bitstream and indicate receipt of the start code by setting the sync flag associated with the start code bytes, or, at least, the start code identifier byte. The controller monitors 445 the sync bit and discards successive data bytes 485 or stores 450 the start code prefix and stream identifier in the video data buffer dependent upon the status of the sync bit 450. After the start code is received, the contents of the data FIFO 224 are continuously loaded 460 into the video data buffer while the data bytes are synchronized 490 and no error has been issued 470 by the source of data or detected 470 by the controller 290 such that the sync flag 230 is set.

Various routines for handling sync and source issued errors may be provided, but preferably, if the source issues an error, data loading 460 proceeds after the error is indicated in the video data buffer 473 and a preselected number of bytes are removed from 480 the data FIFO 224. If a sync error occurs 490, a byte is removed 485 from the data FIFO 224 and the controller 290 seeks the next start code 440 and if both errors occur 470, 475, the controller 290 seeks 440 the next start code in the incoming bitstream after indicating 473 the error in the video data buffer and removal 495 of a preselected number of bytes from the Data FIFO 224.

In the MPEG Systems/Program stream mode 340, the parser 200 expects MPEG-1 System stream syntax or, alternatively, MPEG-2 Program stream syntax. Audio and Video data are assumed to be time multiplexed into one data stream and strobed into the parser on the audio port. The video port data is ignored when operating in this mode, but the data type is distinguished within the bitstream.

While operation regarding data input mode recognition, synchronization, and error handling are similar to that described regarding the elementary mode, the discussed variation in syntax between the elementary (e.g. FIG. 1a), systems (e.g. FIG. 1b) and program (e.g. FIG. 1c) modes requires additional processing in the Systems/Program mode 340.

Figure 5:
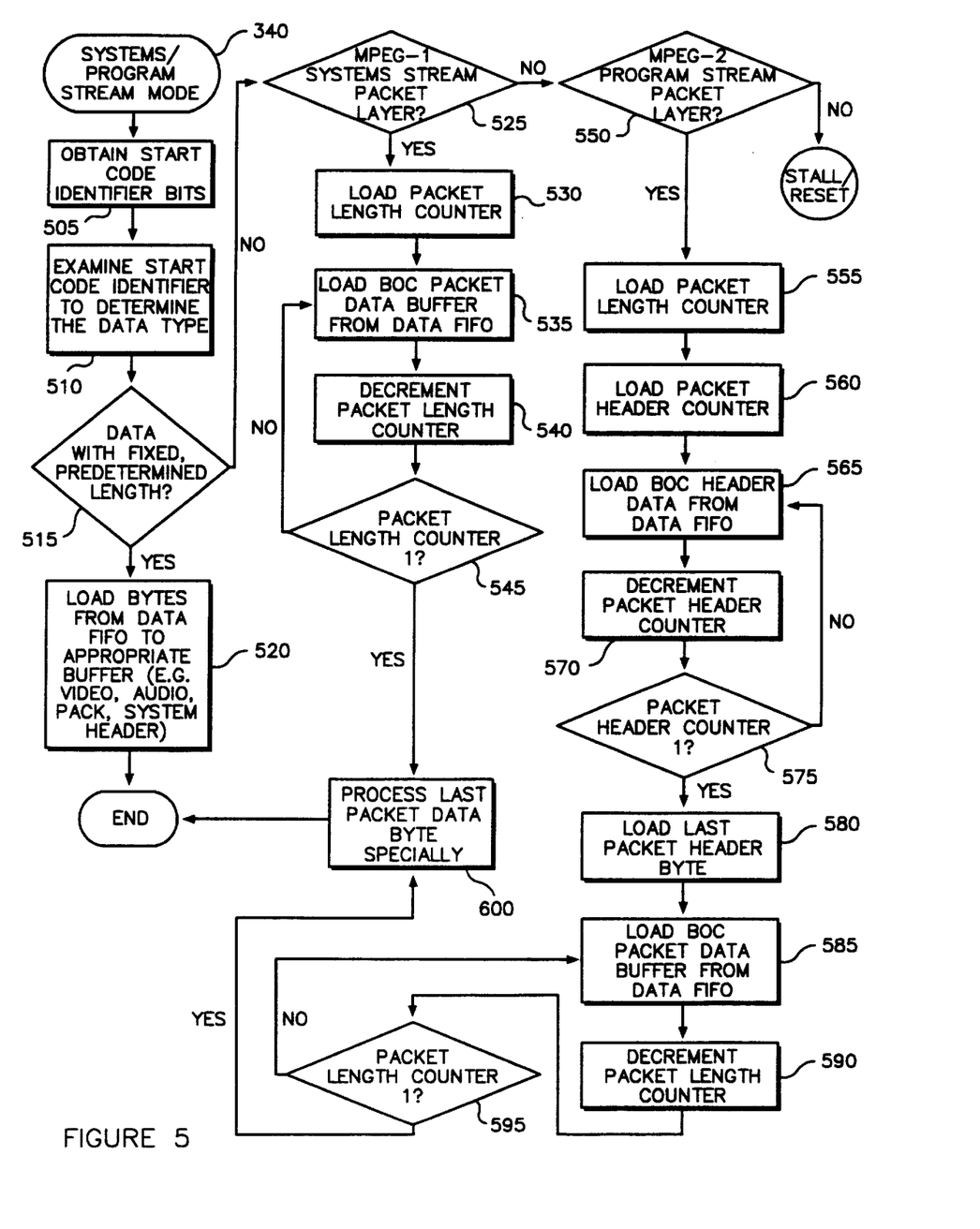
FIG. 5 is a flow chart illustrating parser operation in the systems/program mode in accordance with the present invention.

Referring now to the flow chart in FIG. 5, this mode 340 includes bitstream identification through examination 510 of the start code identifier. Preferably, the parser 200 identifies 510 the bitstream by comparing the identifier to known data stored in memory 294 and, upon a positive identification, branches to the appropriate routine. If the identifier indicates that the bitstream to follow has a fixed, predetermined length such as the pack 27, 37 and system header 29, 39 layers of Systems 25 or Program 30 bitstreams, the controller 290 branches 515 to routines for loading 520 the known number of bytes from the data FIFO 224 to a destination data buffer (not shown) appropriate for the identified data. After the data has been loaded 520 into the appropriate buffer, data flow ends 522 and the parser 200 may be arranged, for example, to seek the next start code. Where the examination 510 of the start code reveals a variable or undetermined length bitstream such as a packet layer 31, 42, the controller branches to routines to handle such layers.

Identification 525 of an MPEG-1 systems stream packet layer 31 prompts loading 530 of the packet length counter 266 according to the information in the packet header followed by sequential byte loading from the data FIFO 224 to the BOC packet data buffer 280. The packet length counter 266 is decremented 540 as bytes are loaded until it equals one 575 whereupon the last byte in the packet layer 31 is processed 600 specially. For example, the last byte may be loaded into the buffer and then the next start code may be sought 602.

An MPEG-2 Program Stream packet layer must be parsed differently since the bitstreams for both the header 41 and packet 42 have lengths which are not predetermined by the syntax, but, rather, are defined within each individual bitstream. Identification 550 of a program stream 30 packet layer 42 prompts the controller 290 to load 555, 560 the packet header counter 260 and the packet length counter 266 according to the information provided in the bitstream 25. Preferably, the parser 200, at the instruction of the controller 290, then loads the BOC header data buffer 272 with byte-aligned header data from the Data FIFO 224 and intermediately decrements 540 the packet header counter 260 until it reaches one 575 whereupon the last byte in the header 36 is loaded 580. Then, the BOC Packet data buffer 280 is loaded 585 from the data FIFO 224 based upon the packet length counter until it reaches one 595 whereupon the last data byte in the packet layer 42 is processed 600 specially. Preferably, the last byte is loaded into its appropriate buffer and then and the next start code is sought.

Figure 1D:
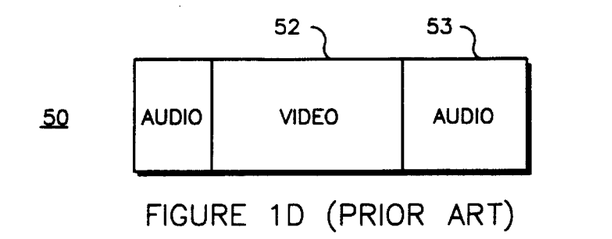
FIG. 1d is a block diagram illustrating a conventional PES packet.

In the PES stream mode, the parser 200 expects to receive audio PES packets on the audio port and video PES packets on the video port. Audio packets strobed through the video port, and vice versa, are discarded. The parser is able to context switch between audio and video port data and assembles those portions of the packet layer that are transmitted to the parser. The basic operation of the parser is similar to that set forth for the elementary and systems/program modes. Here, however, portions of audio and video packets are transmitted to the parser as shown in FIG. 1d. Thus, in addition to the elementary and systems/program mode operations described above, the context switching capabilities of the parser 200 allow it to process one context and to hold the status of that context when another context is identified. Identification is immediate, as each data byte includes an AV status. The controller 290 may be programmed according to the particulars of the PES transfer protocol.

While the present invention has been described with reference to certain preferred embodiments, those skilled in the art will recognize that various modifications may be provided. For example, any multimedia data with a syntax which defines layers of predetermined and/or non-predetermined lengths including those other than MPEG types may be processed by the parser 200. Additionally, dual registers in addition to the packet header counters 258, 260, packet length counters 264, 266, and header and packet data buffers 270, 272, 278, 280 may be provided where additional data portions require intermediate storage. These and other variations upon and modifications to the preferred embodiment are provided for by the present invention which is limited only by the following claims.

We claim:

1. An apparatus for parsing a multimedia bitstream, the apparatus comprising:

a system bus;

an input data organizer, for receiving the bitstream and providing bytes of data to be parsed, the input data organizer including a serial to parallel converter, with an input connected to a serial data input and an output for providing parallel bytes of data; and a multiplexer, with a first input connected to the output of the serial to parallel converter, a second input connected to a parallel data input, and an output that selectively provides the bytes of data to be parsed from one of the parallel data input and the serial to parallel converter output;

a data management buffer, coupled to the input data organizer, for receiving the bytes of data to be parsed, the data management buffer including a data byte portion, a context flag portion, a synchronization flag portion, and an error flag portion;

a controller, including first and second program counters, coupled to the input data organizer and the data buffer, for accessing bytes of data from the data management buffer, determining the context of each accessed byte by analyzing the context flag, tracking the bytes of data for a first context with the first program counter, and tracking the bytes of data for a second context with the second program counter; and a register file, including first and second register sets, the first set maintaining the bytes of data for the first context and the second set maintaining the bytes of data for the second context.

2. The apparatus of claim 1, wherein the register file includes:

a plurality of intermediate data buffers, coupled to the system bus, for receiving data bytes from the data management buffer; and a plurality of counter registers, coupled to the system bus, for maintaining data indicating the amount of data to be loaded into the intermediate data buffers.

3. The apparatus of claim 2, wherein the intermediate data buffers include packet header data buffers and packet data buffers.

4. The apparatus of claim 1, wherein the controller includes a microcode ROM that includes instructions for parsing the multimedia bitstream.

5. For use with a multimedia bitstream parser having a data management buffer and a controller, a method for parsing an incoming bitstream, the method comprising:

detecting a start code in the incoming bitstream, associating a synchronization flag with the detected start code, and providing the synchronization flag and start code to the data management buffer;

providing bytes of data following the start code to the data management buffer;

associating a context flag with each byte of data that is provided to the data management buffer;

determining the context of each data byte in the data management buffer by examining the context flag;

parsing the data byte according to the determined context;

associating an error flag with each byte of data in the data management buffer;

determining the status of the error flag associated to an accessed byte; and processing an error handling routine where the error flag indicates an error.

6. The method of claim 5, wherein the step of processing an error handling routine comprises:

removing a preselected number of bytes from the data management buffer;

indicating the error in a data destination buffer; and accessing the byte that follows the removed bytes in the data management buffer.

7. The method of claim 6, wherein the step of processing an error handling routine comprises:

indicating an error in a data destination buffer;

determining whether a synchronization error has occurred;

removing a preselected number of bytes from the data management buffer; and detecting a next start code in the bitstream.

8. The method of claim 5, further comprising:

identifying a data layer by examining the start code;

determining whether the identified layer has a predetermined length; and where the data has a predetermined length, loading the predetermined number of bytes from the data management buffer to a data destination buffer.

9. The method of claim 5, further comprising:

identifying a first data layer by examining the start code;

determining the amount of data in the first identified layer;

loading data representing the amount of data in the first layer into a first counter;

loading first layer data bytes from the data management buffer to a first intermediate data buffer; and maintaining the amount of first layer data to be processed in the first counter.

10. The method of claim 9, further comprising:

identifying a second data layer by examining a second start code;

determining the amount of data in the second identified layer;

loading data representing the amount of data in the second layer into a second counter;

loading second layer data bytes from the data management buffer to a second intermediate data buffer; and maintaining the amount of second layer data to be processed in the second counter.

11. The method of claim 9, further comprising:

loading first layer data bytes and decrementing the first counter until the counter equals one; and when the counter equals one, loading the last data byte in the first layer and seeking a new start code.

12. An apparatus for parsing a multimedia bitstream, the apparatus comprising:

an input data organizer, for receiving an incoming bitstream and providing bytes of data corresponding to the incoming bitstream;

a data management buffer, coupled to the input data organizer, for receiving each byte of data from the input data organizer and associating a context flag, a synchronization flag and an error flag with each byte of data, the context flag indicating at least one of the port and the media type of the byte of data, and the error flag indicating whether an error is associated with the byte of data;

a controller, coupled to the input data organizer and the data buffer, for parsing the bytes of data from the data management buffer by determining the context of an accessed byte by analyzing the context flag, and initiating an error handling routine where the error flag indicates that an error is associated with the accessed byte, wherein the error handling routine discards a number of bytes of data from the data management buffer.

13. The apparatus of claim 12, wherein the controller uses the synchronization flag to indicate at least one of a synchronization error and a start code.

* * * * *